United States Patent [19]

Kuhn et al.

[11] 4,292,471
[45] Sep. 29, 1981

[54] METHOD OF VERIFYING A SPEAKER

[75] Inventors: Michael H. Kuhn, Hamburg; Horst Tomaschewski, Stuvenborn, both of Fed. Rep. of Germany

[73] Assignee: U.S. Philips Corporation, New York, N.Y.

[21] Appl. No.: 83,197

[22] Filed: Oct. 9, 1979

[30] Foreign Application Priority Data

Oct. 10, 1978 [DE] Fed. Rep. of Germany ....... 2844156

[51] Int. Cl.³ .............................................. G10L 1/00
[52] U.S. Cl. ........................ 179/1 SB; 340/146.3 FT
[58] Field of Search .............. 179/1 SB, 1 SC, 1 SD; 340/146.3 AQ, 146.3 FT

[56] References Cited

U.S. PATENT DOCUMENTS

| | | | |
|---|---|---|---|
| 3,582,559 | 6/1971 | Hitchcock et al. | 179/1 SB |
| 4,053,710 | 10/1977 | Advani et al. | 179/1 SB |
| 4,060,694 | 11/1977 | Suzuki et al. | 179/1 SB |
| 4,078,154 | 3/1978 | Suzuki et al. | 179/1 SB |

*Primary Examiner*—Mark E. Nusbaum
*Assistant Examiner*—E. S. Kemeny
*Attorney, Agent, or Firm*—Thomas A. Briody; Robert T. Mayer; James J. Cannon, Jr.

[57] ABSTRACT

An improved method of verifying the speaker from whom long term spectral characteristics have been derived during a learning phase. Mean values and distance thresholds have been calculated and stored. Improved recognition is obtained by incorporating into the stored values additional values of speech samples in ranges situated outside the distance threshold value. When, during verification, a speech sample not situated within the distance threshold value is encountered its distance from the additionally stored speech samples is successively determined and compared with the separate distance threshold value. The speaker is rejected only if the speech sample to be verified is not situated at a sufficiently small distance from any of the additionally stored speech samples. The method thus increases the recognition range to better approximate the actual distribution of speech samples of the learning phase.

9 Claims, 8 Drawing Figures

METHOD OF VERIFYING A SPEAKER

BACKGROUND OF THE INVENTION

The invention relates to a method of verifying a speaker from which a number of reference speech samples are obtained, a number of characteristics being derived in the same manner from each reference speech sample, the mean value being determined of the values of a characteristic of all reference speech samples, from the characteristic values of all reference speech samples there being determined a distance value, the characteristic mean values and the distance value being stored. From the speech sample to be verified there are derived characteristics in the same manner and the distance of this speech sample from the center point given by the characteristic mean values being formed from the sum of the squares of the differences between each characteristic value of the speech sample and the associated characteristic mean value, an O.K. signal being generated when the sum at the most equals the distance value.

DESCRIPTION OF THE PRIOR ART

A method of this kind can be used in various fields, for example, for guarding the access to high-security areas or in banking operations in order to obtain automatic identification of a customer and to enable the customer to withdraw cash money from his account by an automatic money dispensing device outside bank opening hours. Relevant speakers must then be prepared to speak a given or possibly random text for verification of their voice, speaker-specific characteristics being derived as much as possible from said spoken text. Because the human voice is not exactly reproducible, a plurality of speech samples must be delivered in order to obtain a sensible recognition rate, i.e. the speaker must speak a given text or different texts a number of times, preferably at different times. From these reference speech samples characteristic ranges or mean values are derived, and during a later verification it is checked whether the characteristics are within the range or whether the deviations from the mean values in total do not exceed a given value.

The mean value ranges or mean values are stored in some form, so that they are available during verification for comparison with a speech sample then delivered. The storage can be realized in the evaluation device, but in the case of a large number of speakers a very large storage space is then required. Therefore, notably in the case of banking operations, identity cards are used on which the comparison values obtained from the reference speech samples are stored, preferably on a magnetic strip, and for verification first the values stored on the identity card are read and input in the evaluation device, after which the speech sample to be verified is input and compared with the values read from the identity card. For identity cards of this kind a given standard format has already been developed and a given, limited number of data characters or bits can be stored on the magnetic strip. This number of bits, however, is not sufficient for known methods of verifying a speaker when an effective recognition rate and adequate protection against other speakers is required. The described method, utilizing a so-called minimum distance classifier, requires a comparatively small number of data to be stored, but too many undue rejections occur, i.e. the right speaker is unduly rejected, when the distance value is chosen to be so small that it very narrowly bounds the reference speech samples or leaves some reference speech samples outside the distance value; on the other hand, in the case of an adequate distance value, few undue rejections occur, but the risk of undue recognition is much higher, i.e. a speaker A who pretends to be speaker B, for example, after stealing the latter's identity card, is actually recognized as speaker B. This is impermissible for normal banking operations.

The invention has for its object to provide a method of verifying a speaker where only a limited number of data from the reference speech samples of a speaker are stored and where the verification process is still executed with a small number of undue recognitions and also a small number of undue rejections.

SUMMARY OF THE INVENTION

This object is realized in accordance with the invention in that from the differences between the characteristic values of two reference speech samples of at least a part of all reference speech samples a separate distance value is determined and stored, in addition there being stored the characteristic values of reference speech samples which are situated outside the range defined by the center point and the distance value, for the verification of a speech sample to be verified whose distance from the center point is larger than the distance value, the distance from the additionally stored reference speech samples being successively determined and compared with the stored separate distance value, an O.K. signal being generated if at least one distance is smaller than the separate distance value. The distance value can thus be determined to be comparatively small, so that normally some of the reference speech samples are situated outside the range determined by the center point and the distance value, and these reference speech samples situated outside the range are then separately stored, so that a speech sample to be verified which is situated outside this range but sufficiently near to a reference speech sample is still recognized as being correct.

A classifier in which the distance between a sample to be classified and one of a number of reference samples is determined and compared with a fixed threshold value is known from the field of sample recognition and is referred to as a "nearest neighbour" classifier. The use of this kind of classification for the described method of verifying a speaker, however, would mean the storage of all reference speech samples with all characteristic values; however, for an increasing number of reference speech samples, the required storage space on the identity card increases essentially linearly and exceeds the storage space available considering the required number of reference speech samples.

The storage space available on an indentity card cannot be filled for many speakers if only the characteristic values of the reference speech samples are stored which are situated outside the range defined by the centre point and the distance value. In order to utilize any storage space remaining, it is effective to store the characteristic values of the further reference speech samples within the range defined by the center point and the distance value in the separate range of which, defined by the relevant reference speech sample and the separate distance value, the largest number of further reference speech samples are situated, said separate range being situated partly outside said range, the distance of the speech sample to be verified being determined also with respect to these reference speech samples and being compared with the separate distance value. The range in which a speech sample to be verified is still considered O.K. is thus additionally increased, because the contour of the range better approximates the actual distribution of the reference samples as a result of the described steps.

When the characteristic values of the additionally stored reference speech samples are to be stored with adequate accuracy, a large number of bits are required for each additionally stored reference speech sample. In order to reduce this number of bits, the characteristic values of all additionally stored reference speech samples are preferably stored as difference values with respect to the associated characteristic mean values, the characteristic values being determined from the stored values before verification of a speech sample. Because the differences or distances between the additionally stored reference speech samples and the center point are comparatively essentially smaller than the value of the center point coordinates formed by the characteristic mean values, the storage of additional reference speech samples can thus be realized with higher accuracy and a smaller number of bits.

Preferably, for the determination of the separate distance value from the differences between the characteristic values of two reference speech samples, only the reference speech samples are used which are situated within the range defined by the center point and the characteristic mean values. As a result, the effect of the reference speech samples which are not very characteristic of the relevant speaker on the separate distance value is thus eliminated.

In order to enable the processing of different speech samples, the characteristic values of the individual speech samples should be available in a normalized form. Therefore, the characteristic values of each reference speech sample and each speech sample to be verified are preferably multiplied prior to processing, by such a factor, that the sum of the values of a speech sample derived from the characteristic values in the same manner has a predetermined value. Thus, a uniform relationship exists between all characteristic values.

When the squares of the differences of the separate characteristic values are directly summed during the determination of the distance of the speech sample to be verified from the center point or from the additionally stored speech samples, all characteristics are introduced with the same weight. However, the separate characteristics can actually be reproduced by the speaker with different accuracy, that is to say separate characteristics have a smaller fluctuation range, and these characteristics may be different for different speakers. Characteristics whose values strongly fluctuate in different reference speech samples therefore, should have a smaller effect on the value of the distance. Therefore, for each characteristic an associated weighting factor is preferably stored and for the determination of the distance of the speech sample to be verified from the center point or from an additionally stored reference speech sample the terms are preferably multiplied by the associated weighting factor before summing. The spread of the characteristic values can thus be better taken into account. Preferably, the reciprocal value of the variance of the associated characteristic is used as the weighting factor, the variance being the mean value of the squares of the deviations of the associated characteristic values of all reference speech samples from the characteristic mean value. Thus, the different significance of the individual characteristics is best taken into account for as correct as possible verification.

Because the variance is a measure of the deviation of the characteristic values of all reference speech samples from each other, that is to say an absolute measure, for all weighting factors together, a large storage space must be made available to obtain accurate representation also of the largest weighting factor. However, there is a very high probability that the variance of a characteristic in an absolute sense is larger as the value of the characteristic itself is larger. Therefore, in order to save storage space, before the storage of the weighting factors, they are preferably divided by a value derived from the associated characteristic mean value, only the partial value thereof which exceeds a predetermined minimum value being stored, the weighting factors being determined from the stored and the predetermined value, before the identification. Because the variance values are related to the characteristic mean value, a quotient is obtained whose value sooner has a uniform order of magnitude also in the case of different characteristics with different variances. This quotient can then be stored with less bits, the accuracy of the weighting factor determined from the quotient not being essentially less for small absolute values than for large absolute values. Direct division by the characteristic mean value may give rise to problems, because it may have the value 0 for at least one or some characteristics. Therefore, division by a characteristic mean value which has been increased by a fixed amount, for example, by one unit or by one quantization unit, is to be preferred. Furthermore, it may be assumed that a quotient thus obtained does not become 0, but lies between a minimum value and a maximum value also for different speakers. This minimum value, therefore, can be predetermined from tests and subtracted from the quotient, so that the range of values for the number to be stored becomes even smaller. Quotients which are actually smaller than this minimum value are then fixed at this minimum value. Even in the case of many characteristics, a suitably accurate weighting factor can thus be stored.

Various possibilities are known for deriving characteristics from a speech signal, for example, the variation of the fundamental speech frequency, like a histogram, or similarly the interval ratio. A particularly simple possibility of deriving significant characteristics from a speech signal, however, is offered by the fact that the characteristics are the frequency components of the long-term spectrum of a speech sample. Only a filter bank and a summing device are then required.

BRIEF DESCRIPTION OF THE DRAWINGS

Embodiments in accordance with the invention will be described in detail hereinafter with reference to the drawing.

DESCRIPTION OF THE PREFERRED EMBODIMENTS

Figure 1:
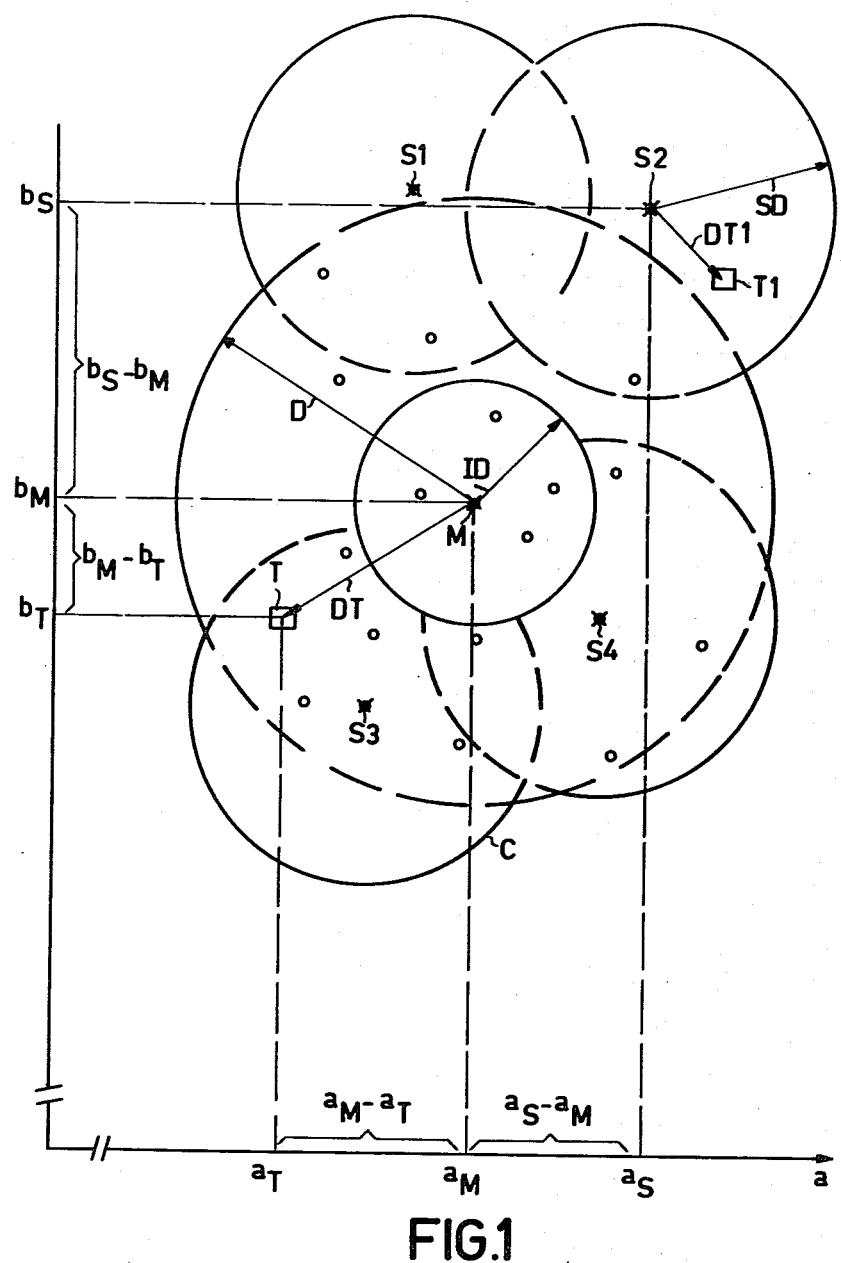
FIG. 1 is a diagrammatic representation to illustrate the various values to be stored and compared when only two characteristics are derived from each speech sample.

For the graphic representation in FIG. 1 it is assumed that only two characteristics are derived from each speech sample in order to enable a clear, two-dimensional representation. In the case of three characteristics per speech sample, a three-dimensional representation is still possible, but this cannot be shown in such a clear manner in the drawing. In practice, of course, more characteristics are derived from a speech sample, so that a characteristic volume with a corresponding number of dimensions is formed which, however, cannot be depicted in a drawing. The relationship between the speech samples or their characteristic values, however, in the multi-dimensional volume correspond exactly to the two-dimensional representation.

The two characteristics on which FIG. 1 is based are denoted therein by the letters a and b; the values of these characteristics can increase in the direction of the arrows. The speech samples are denoted by small circles, some of which are denoted by the references S1 to S4. The position of each speech sample is given by the values of the two characteristics of this speech sample. For the speech sample S2, for example, both characteristics have a high value, while for speech sample S3 both characteristics have a low value.

The assembly of speech samples shown in FIG. 1 has a center point whose position is denoted by a cross in FIG. 1, said cross being denoted by the letter M. The coordinate values or characteristic values for this center point are determined by the mean value of the corresponding characteristic value of all speech samples.

Furthermore, a distance value is determined from the characteristic values of all speech samples. This distance value can be determined in a variety of ways; a feasible step for determining the distance value will be described further on. The points in the characteristic surface in FIG. 1 which are situated at approximately this distance value from the center point form a circle having a radius D which equals the distance value. The characteristic values for the center point M and the distance value D are stored for each speaker, for example, on the magnetic strip of an already described identity card, for which it is assumed that the speech samples shown in FIG. 1 have been taken from the speaker during the learning phase.

When at a later stage this speaker delivers a speech sample for verification, the characteristics a and b are again derived from this speech sample and their values are determined. In FIG. 1 this speech sample is assumed to be situated in the characteristic surface at the area of the rectangle denoted by the letter T. In order to check whether this speech sample actually belongs to the relevant speaker, the distance DT between the point T of this speech sample and the center point M is determined, and this distance DT is compared with the distance value D. The distance DT can be determined in known manner as follows:

When $a_M$ and $b_M$ are the characteristic values of the center point M and $a_T$ and $b_T$ are the characteristic values of the speech sample to be checked, the distance DT follows from the differences $a_M - a_T$ and $b_M - b_T$ of the same characteristics in accordance with $$DT = \sqrt{(a_M - a_T)^2 + (b_M - b_T)^2}$$

This similarly applies to the higher-dimensional characteristics volume for more than two characteristics. In the example shown, the value of the distance DT is smaller than the distance value D, so that for this speech sample an O.K. signal is generated.

It can be seen in FIG. 1 that the two speech samples denoted by the references S1 and S2 are situated outside the range formed by the circle around the center point M with the distance value D. When the relevant speaker delivers a speech sample which is situated in the vicinity of the speech sample S2 but outside said range, this speech sample would not be recognized as belonging to the speaker, even though it is situated very near to a speech sample of this speaker delivered during the learning phase. In order to prevent this and to ensure that such speech samples are also recognized as belonging to the speaker, the characteristic values of the speech samples S1 and S2 from the learning phase are also stored in accordance with the idea of the invention. Moreover, a separate distance value SD is stored which is determined from the characteristic values of all speech samples derived during the learning phase, notably from the speech samples which are situated inside the circle around the center point M with the radius D equal to the distance value, as will be explained hereinafter. When a speech sample is delivered which is situated in the characteristic surface in FIG. 1 on the rectangle denoted by the reference T1, so that its distance from the center point M is larger than the distance value D, moreover, the distance of this speech sample T1 from the additionally stored speech samples S1 and S2 is determined. The latter distance has the value DT1 which is smaller than the separate distance value SD. The speech sample T1 is thus also determined as belonging to the relevant speaker and O.K. signal is generated.

For the storage of the additional speech samples, for example, the speech sample S2, it is not necessary to store their characteristic values $a_S$ and $b_S$, but only the differences with respect to the corresponding characteristic values $a_M$ and $b_M$ of the center point M. These difference values $a_S - a_M$ and $b_S - b_M$ are normally essentially smaller than the absolute characteristic values, so that fewer bits are required for the storage of the difference values. Because the characteristic values of the center point M are also stored, the characteristic values of the additional speech samples can be simply determined from the values stored.

In the example shown in FIG. 1, only the two speech samples S1 and S2 are situated outside the range corresponding to the circle around the center point M with the radius D. Thus, the storage space available, in this case, for example, the magnetic strip on said identity card, cannot yet be filled; there is, for example, room left for the characteristic values of two further speech samples. In order to use this storage space, the characteristic values of two further speech samples are stored, however, said further samples being situated within the range. However, only the storage of speech samples which expand this range makes sense. Such samples can only be speech samples which are situated outside the circle around the center point M which has a radius which equals an inner distance ID when this inner distance has the following value:

$ID = D - SD$.

For a suitable selection from these speech samples, it is determined for each of these speech samples how many other such speech samples have a distance smaller than the separate distance value SD, i.e. how many other speech samples are situated inside the circle around the relevant speech sample with the radius SD. In the example shown in FIG. 1, a total of five other speech samples are situated within the corresponding separate range of the speech sample S3, so that the characteristic values of the speech sample S3 are the next values to be additionally stored. In the separate range of the speech sample S4 four further speech samples are situated, so the characteristic values of the speech sample S4 are also additionally stored. Thus, all speech samples which are situated within the range having the expanded contour C are recognized as belonging to the speaker. This contour C corresponds better to the actual distribution of the speech samples as can be seen from the example shown. This complex contour can be stored with a comparatively small number of bits when the described steps are taken.

Figure 2:
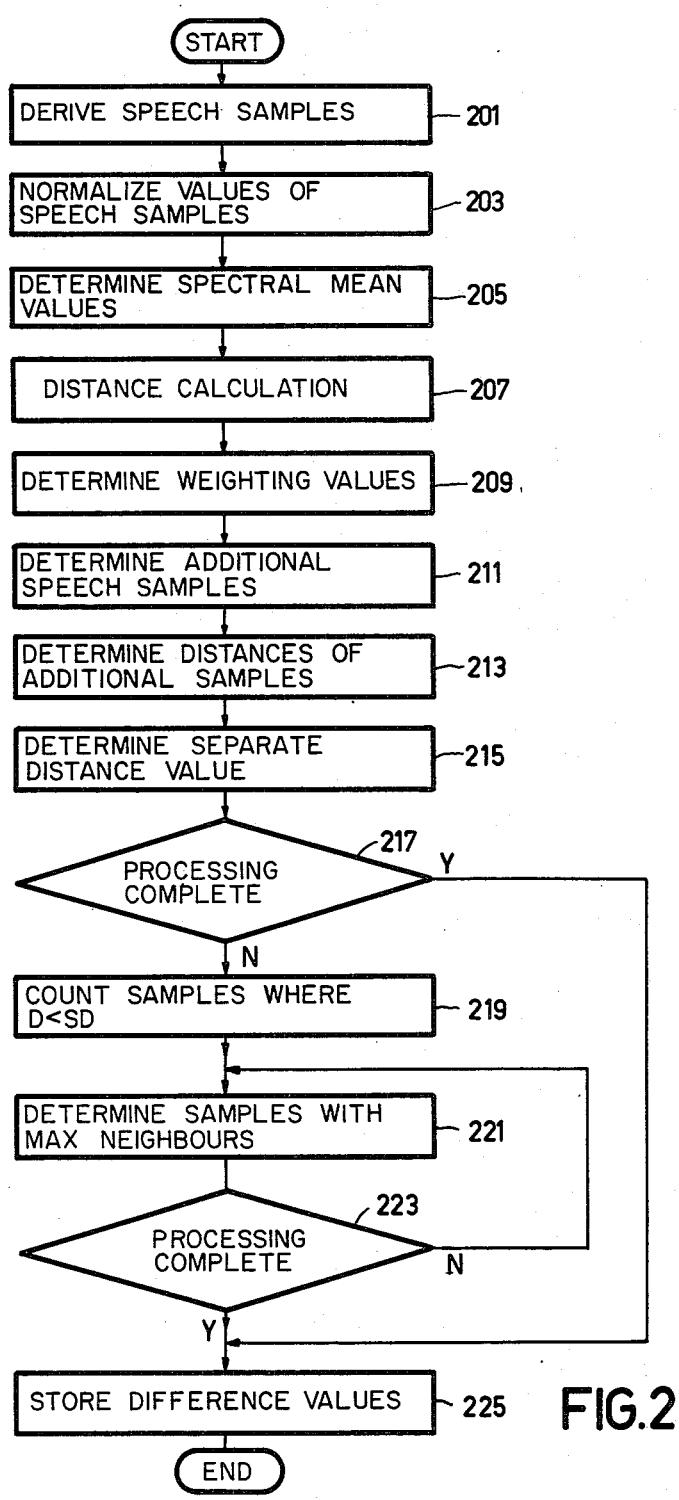
FIG. 2 shows a flow diagram of the processing steps for generating the values to be stored.

The processing steps for generating the data to be stored are diagrammatically shown in the flow chart of FIG. 2. The execution of these processing steps can be realized by means of the arrangements shown in the FIGS. 3 to 6 which will, therefore, be described each time with reference to the flow chart.

Figure 3:
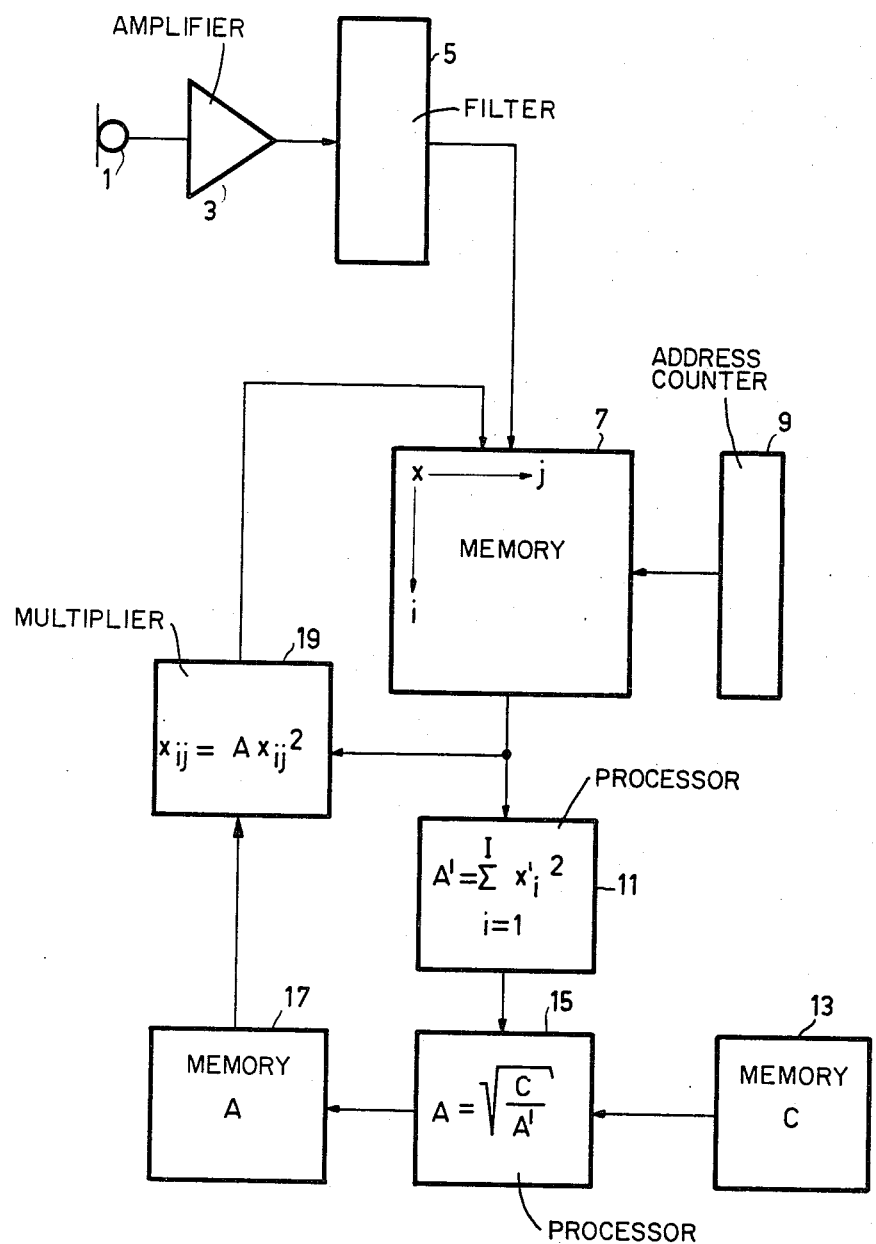
FIGS. 3–6 show arrangements for processing the reference speech samples and for generating the data signals to be stored.
Figure 4:
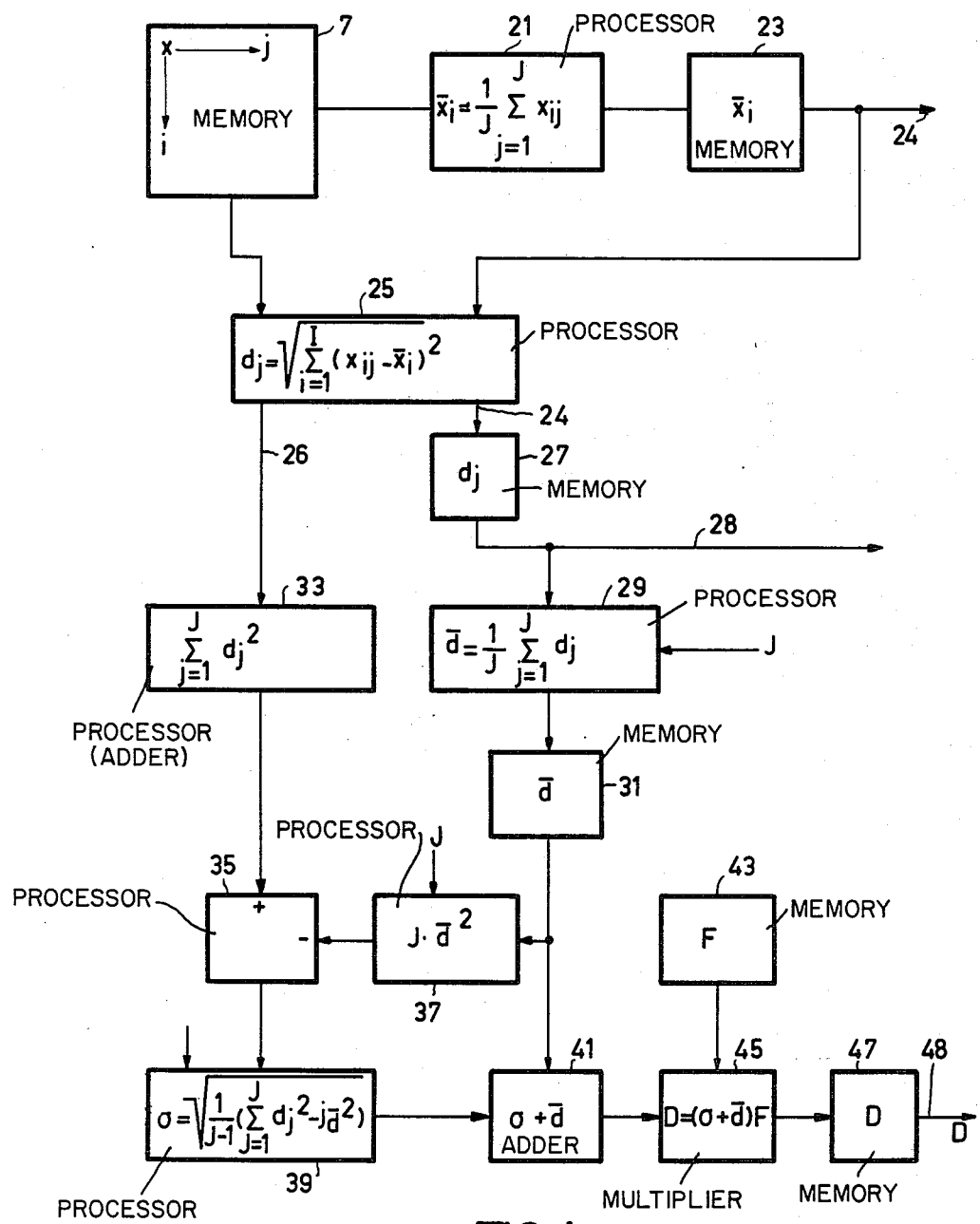
Figure 5:
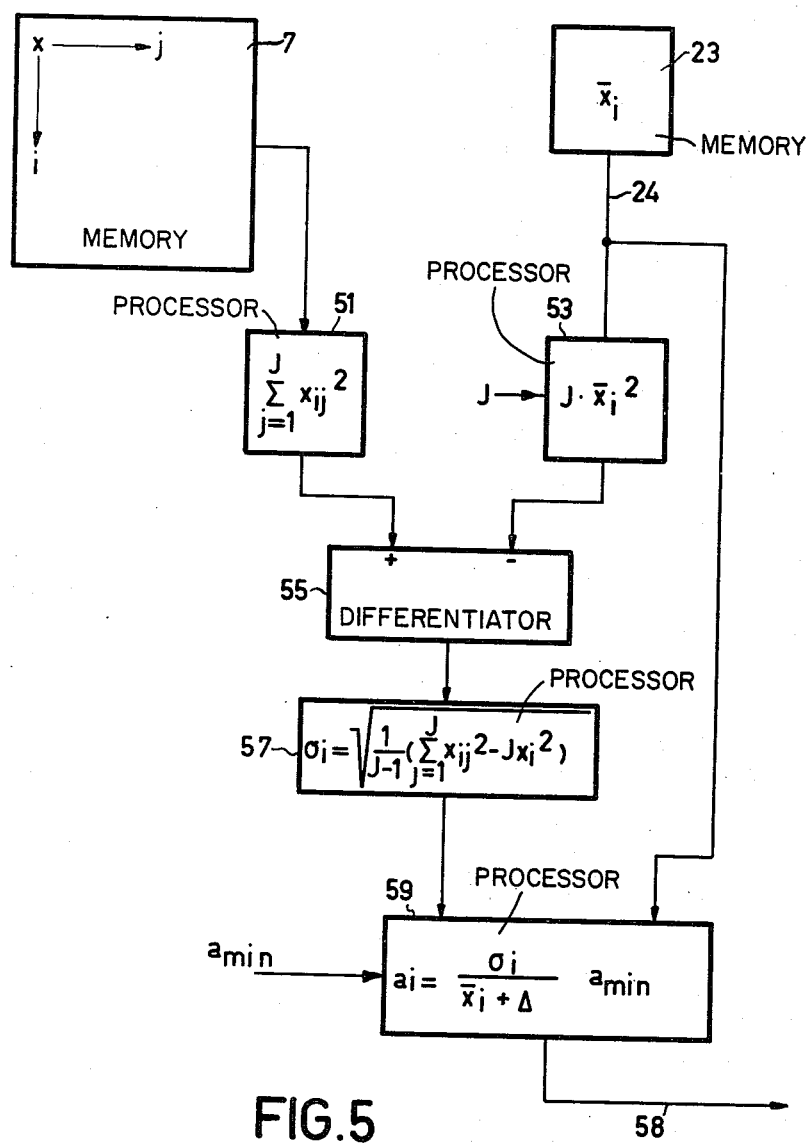
Figure 6:
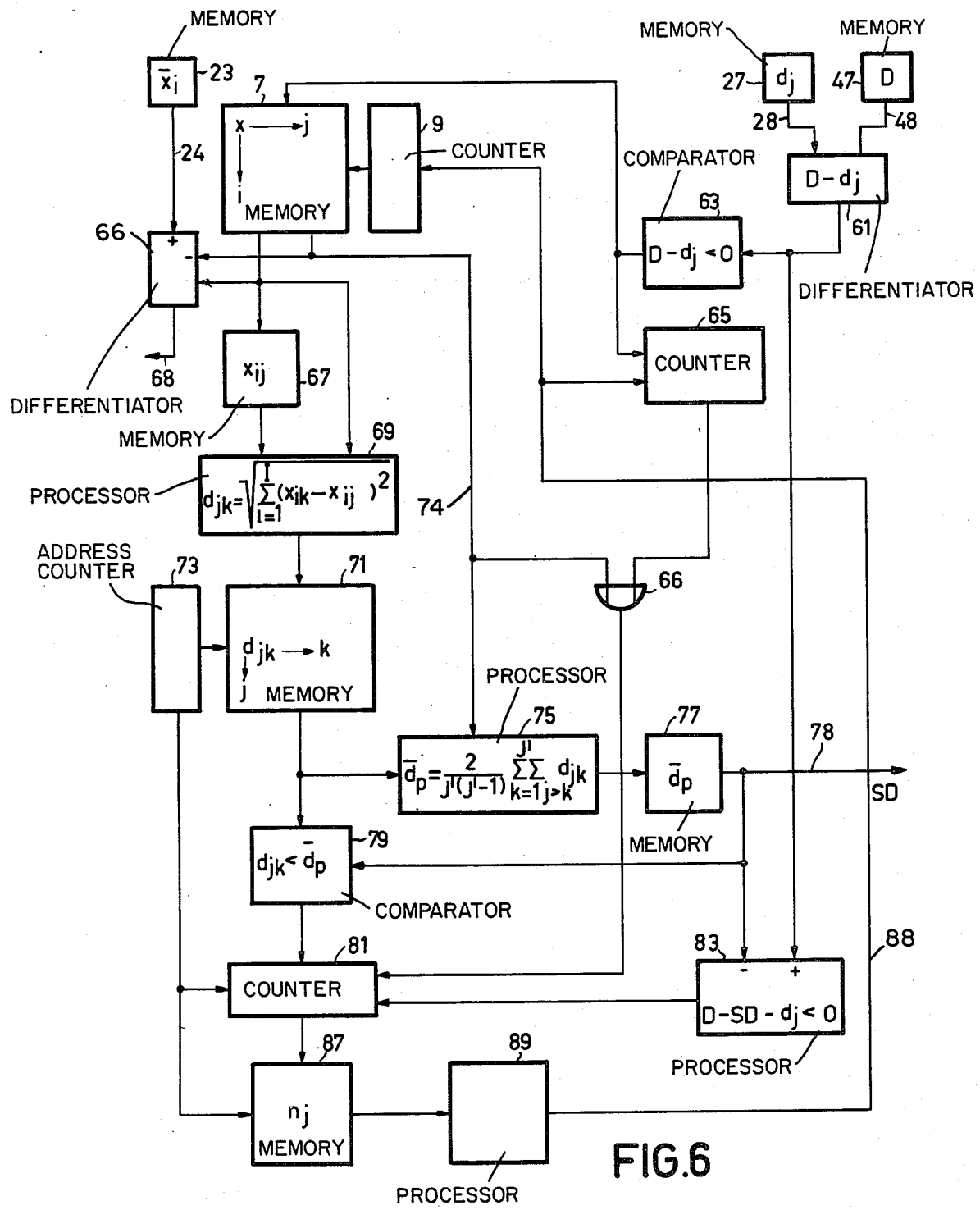

During the processing step 201, first the speech samples of the speaker to be verified are derived. To this end, FIG. 3 shows a microphone 1 which converts the speech signals into electrical signals. In an amplifier 3, these signals are amplified and, if necessary, the dynamics thereof are limited or controlled. The speech signal thus obtained is applied to a filter bank 5. This filter bank comprises a number of filters for one of a number of adjacent frequency ranges, and the output signals of these filters are sampled and intermediately stored at regular time intervals, for example, every 20 ms. The values derived during successive sampling operations are summed according to frequency range, so that at the end of the speech sample a long-term spectrum is available in which the value of each frequency range indicates the total energy in this frequency range during the speech sample. The frequency ranges thus represent the characteristics derived from the speech sample, and the values of the long-term spectrum are the characteristic values in this example. It is to be noted that the following description is also applicable to characteristics derived in a different manner.

The values of the long-term spectrum thus obtained are stored in the memory 7. This memory 7 is shown as a matrix memory in FIG. 3, it being assumed for the sake of clarity that the values of a long-term spectrum, denoted by the index i, are stored in memory word locations which are arranged one below the other, each memory word location comprising a number of bits.

As has already been stated, a plurality of speech samples are taken from the speaker to be verified during the learning phase, and each speech sample is processed to form a long-term spectrum in the same manner in the filter bank 5; the values of the long-term spectrums, denoted by the index j, are stored in adjacent columns of memory word locations in the memory 7. This storage sequence is obtained by corresponding control of the address counter 9. It will be clear that the actual spatial organization of the memory word locations in the memory 7 may also be different.

In order to enable processing of the long-term spectrums, the values must be available in a comparable range. For this purpose, the values are normalized during the processing step 203. To this end, the separate values $x_i$ are multiplied by a factor A such that the following is applicable to all multiplied $x_i$:

$$\sum_{i=1}^{I} x_i^2 = C$$

in which C is a value which is the same for all long-term spectrums. This is achieved by means of a factor A which satisfies the following condition $$A = \sqrt{\frac{C}{\sum_{i=1}^{I} x_i'^2}}$$

This factor A must be separately determined for each long term spectrum.

For executing this normalization operation, the values $x'_i$ in FIG. 3 are successively read from the memory 7 and applied to a processor 11 which forms and sums the squares of these values. Thus, on the output of the processor 11 a signal $A'$ appears having the value $$A' = \sum_{i=1}^{I} x_i'^2$$

This value is applied to a further processor 15 which also receives, in addition to the value stored in the memory 13, the constant C and which generates an output signal which has the above value for the factor A; this signal is intermediately stored in the memory 17. Arrangements for generating output signals in the form of parallel binary signals which, when considered as a dual number, have a given value which is derived from the value of corresponding input signals by a predetermined arithmetic operation, are known per se and will not be elaborated herein; only the interconnection of these processing arrangements in the form of embodiments will be described hereinafter. The progress control which controls the sequence of the successive processing operations in the individual processors and which comprises essentially a counter and possibly a memory controlled thereby, and also a required clock pulse generator have been omitted for the sake of clarity.

The normalization of the separate spectral values of each long-term spectrum takes place during the next step in that the spectral values of the same long-term spectrum are read again and applied to the multiplier 19, the other input of which receives the signals representing the value of the factor A, the multiplied values being written again in the same location. The spectral values thus obtained are denoted as $x_i$. This process is successively performed for all long-term spectrums.

During the subsequent processing step 205, the spectral mean values are determined which represent the coordinates of the center point of the speech samples. To this end, in FIG. 4 the value $x_{ij}$ of a spectral component i of the speech samples j in total is read from the memory 7 and applied to the processor 21. The latter unit sums the applied value and produces a (multiple) output signal for each spectral range i having the value $$\bar{x}_i = \frac{1}{J} \sum_{j=1}^{J} x_{ij}$$

which represents the mean value of the spectral values of one spectral component over all speech samples, this signal being stored in the memory 23. The output of the memory 23 for the coordinates of the center point M is connected, via the lead 24, to a memory (not shown), for example, the magnetic strip of the said identity card, where the corresponding values are stored either directly or at a later stage after completion of all processing steps.

Subsequently, all values are read again from the memory 7, but this time successively the spectral values of one sample, and these values are applied to the processor 25 which also receives the spectral mean values from the memory 23. This unit 25 calculates the distances $d_j$ of the individual speech samples j from the center point $$d_j = \sqrt{\sum_{i=1}^{I} (x_{ij} - \bar{x}_i)^2}$$

Referring to FIG. 2, block 207 represents this distance calculation step. These distances are output via the output 24 and are intermediately stored in the memory 27. Via the line 26, the signals of the intermediate results are output before root extraction, said signals thus representing the square of the separate distances, and being applied to a unit 33 which sums the squares of all speech samples.

The signals representing the distances $d_j$ of the separate speech samples are applied, via the line 28, inter alia to the processor 29 in which they are summed over all speech samples, the sum being divided by the number J of speech samples. The number of speech samples may be stored in a memory which is not shown for the sake of clarity, and is applied to the processor 29 and also to further processors. The result then produced is mean distance $\bar{d}$ of all speech samples from the center point $$\bar{d} = \frac{1}{J} \sum_{j=1}^{J} d_j$$

This mean distance value is intermediately stored in the memory 31.

The output of the memory 31 is connected to the processor 37 which forms the square of the mean distance and multiplies this value by the number J of all speech samples, the value of which is also applied to the processor 37. The result is applied to a differentiator 35 and is subtracted therein from the value formed in the processor 33. The output of the differentiator is connected to the processor 39 which also receives the value of the number J of all speech samples, and on its output this processor 39 produces a value for the standard deviation as the root of the variance $\sigma^2$ in accordance with the following equation $$\sqrt{\sigma^2} = \sqrt{\frac{1}{J-1} \sum_{j=1}^{J} (d_j - \bar{d})^2}$$

This equation is not directly used, but the fact is utilized that in this equation an expression can be converted:

$$\sum_{j=1}^{J} (d_j - \bar{d})^2 = \sum_{j=1}^{J} d_j^2 - 2\bar{d} \underbrace{\sum_{j=1}^{J} d_j}_{J \cdot \bar{d}} + \underbrace{\sum_{j=1}^{J} \bar{d}^2}_{J \bar{d}^2}$$

The actual calculation of the standard deviation results therefrom:

$$\sqrt{\sigma^2} = \sqrt{\frac{1}{J-1} \left( \sum_{j=1}^{J} d_j^2 - J \cdot \bar{d}^2 \right)}$$

The value of the standard deviation is then applied to an adder 41 which, moreover, receives the value of the mean distance $\bar{d}$ from the memory 31, and this sum is applied to a multiplier 45 for multiplication by a factor contained in a memory 43, the result being stored in the memory 47. This result is the distance value D of thus determined in accordance with the following equation $$D = \left[ \bar{d} + \sqrt{\sigma^2} \right] \cdot F$$

(see processing step 207, FIG. 2) and which is applied, via the line 48, to the memory, for example, the magnetic strip of an identity card. The ultimate storage preferably takes place only after completion of all processing steps. Moreover, the output signals of the memory 47 are required for further processing steps, as will be explained hereinafter.

The factor F stored in the memory 43 is an empirically found value which may be varied in given circumstances, as will be explained hereinafter.

The next processing step in FIG. 2 is the step 209 where the weighting values are determined for the weighting factors. For this purpose, from the memory 7 in FIG. 5 there are again successively read the values $x_{ij}$ of a spectral component i of all speech samples j, like previously in FIG. 4 for the determination of the mean value in the processor 21, which values are applied to the processor 51 where they are squared and the squares of a spectral component are summed. The signals thus produced are applied to a differentiator 55, the other input of which receives at the same times from the processor 53 signals corresponding to the square of the associated spectral mean value $\bar{x}_i$, multiplied by the value J which equals the number of speech samples, said processor 53 being connected to the memory 23 for the spectral mean values via the line 24. In the differentiator 55 the values from the processor 53 are subtracted from the values from the processor 51, and the result is applied to a processor 57 which determines therefrom the variances $\sigma_i$ of the separate spectral components i as follows $$\sigma_i = \sqrt{\frac{1}{J-1} \left( \sum_{j=1}^{J} x_{ij}^2 - \bar{x}_i^2 \right)}$$

These variance values are not stored directly, but are first applied to the processor 59 in order to reduce the range of values, said processor determining weighting numbers $a_i$ therefrom as follows:

$$a_i = \frac{\sigma_i}{\overline{x}_i + \Delta} - a_{min}$$

For this purpose, the processor 59 also receives the spectral mean values from the memory 23 and also a fixed, empirically found value $a_{min}$. Because the value of the variance $\sigma_i$ normally becomes large only for large spectral mean values $\overline{x}_i$, the range of values of the fraction is smaller than the range of values of the variances themselves. The value of $\Delta$ amounts to a unit of the spectral mean values or a quantizing step and serves to avoid overflow during the calculation when the spectral mean value of the relevant spectral range is 0, which may be the case notably for female voices and low frequency ranges. The subtraction of the minimum value leads to a further limitation of the value range. During the later recalculation of the weighting factors this leads to a limitation of the maximum value of a weighting factor.

The output signals of the processor 59 corresponding to the weighting numbers $a_i$ are possibly stored in an intermediate memory (not shown) before they are applied, via the line 58, to the ultimate memory, for example, the magnetic strip of an identity card.

The determination of the speech samples to be additionally stored and the separate distance value will be described hereinafter, the next processing step being the step 211 in the flow chart of FIG. 2 where the speech samples are determined whose distance from the center point is larger than the distance value. For this purpose, the output of the memory 47 in FIG. 6 which receives the distance value D is connected, via the line 48, to a differentiator 61, the other, subtracting input of which is connected, via the line 28, to the output of the memory 27 which contains the distances of all speech samples from the center point. The output of the differentiator 61 is connected to the input of a comparator 63 which checks whether the output signal is smaller than or larger than or equal to zero. From the memory 27 the distance $d_j$ of each speech sample is successively read and in parallel therewith the counter 9 is controlled so that it addresses the corresponding column of word locations in the memory 7 for this speech sample, i.e. an additional storage location in this column, and when the comparator provides a difference value smaller than 0, a mark is written in this storage location. The comparator 63 has connected to it a counter 65 which counts how many speech samples are situated further from the center point than the distance value D. For the marking of the speech samples which are situated outside this distance value range use can alternatively be made of an additional memory.

The next processing step in FIG. 2 is the step 213 for determining the distances $d_{jk}$ of two speech samples j and k. To this end, in this example the spectral values of the first sample are read from the memory 7 and applied to an intermediate memory 67. Subsequently, the spectral values of the second speech sample are read and applied to a processor 69, and in parallel therewith the corresponding spectral values are read from the memory 67 and also applied to the processor 69 which determines the pair-wise distance $d_{jk}$ of the two speech samples as follows $$d_{jk} = \sqrt{\sum_{i=1}^{I}(x_{ik} - x_{ik})^2}$$

The value of this distance is applied to the memory 71 in which it is stored. Subsequently, the spectral values of the third speech sample are read from the memory 7, while the content of the memory 67 remains unchanged, thus determining the distance between the first and the third speech sample. It is only after the spectral values of the last speech sample have been read that the spectral values of the second speech sample are intermediately stored in the memory 67, after which the spectral values of the third speech sample are read, etc. The distances of all speech samples from each other are thus successively stored in the memory 71. The addressing of this memory 71 during writing as well as reading is controlled by the address counter 73.

The next step in FIG. 2 is the processing step 215 for determining the separate distance value. For this purpose, the pair-wise distances of the speech samples are read from the memory 71 in FIG. 6 and applied to the processor 75 in which these pair-wise distances are summed and therefrom the mean pair-wise distance $\overline{d}_p$ is determined. However, not all pair-wise distances are summed, but parallel to the reading of the distances from the memory 71 the mark produced by the comparator 63 is read from the memory 7 or from an additional memory and is applied, via the line 74, to the processor 75, so that only the pair-wise distances are summed which concern speech samples whose distance from the center point is smaller than the distance value D. Thus, in the processor 75 a mean distance value $\overline{d}_p$ is determined as follows $$\overline{d}_p = \frac{2}{J'(J'-1)} \sum_{K=1}^{J'} \sum_{j>k} d_{jk}$$

in which J' is the number J of all speech samples, reduced by the counting position of the counter 65. This mean distance $\overline{d}_p$ is intermediately stored in the memory 77. The value available on the output of this memory is the separate distance value which is applied, via the line 78, for example, to the magnetic strip of an identity card.

Referring to FIG. 2, block 217, when the counting position of the counter 65, that is to say the number of speech samples with a distance from the center point which is larger than the distance value, is exactly equal to the number of speech samples to be additionally stored, the processing has been completed. This is indicated by "Y" in FIG. 2, block 217. The memory 7 is then read again, that is to say successively the spectral values of one speech sample, and these values are applied to a differentiator 66 which subtracts from these values of the corresponding spectral mean values which are applied from the memory 23, via the line 24, to the differentiator 66. The difference is applied, via the line 68, to the magnetic strip of the identity card, if at the same time on this line 74 a signal appears which indicates that this speech sample is situated outside the distance value.

However, if the counting position of the counter 65 is higher than this value, there are several possibilities. For example, the value of the factor F in the memory 43 of FIG. 4 can be increased, so that the distance value is increased and hence more speech samples are situated within the distance value. The processing steps 207 to 215 must then be repeated. However, in the present example the processing step 219 is executed in the same way as in the case where the counting position of the counter 65 is lower than the number of additional speech samples, said processing step 219 following the interrogation 217, output "N," which corresponds to the interrogation of the counter 65. During this processing step for each speech sample the number of speech samples is counted which are removed by less than the separate distance value from this speech sample. For executing this processing step, from the memory 71 in FIG. 6 the values are read of all pair-wise distances $d_{jk}$ in which each time a speech sample is involved, the counter 73 being controlled accordingly. These values are applied to a comparator 79 which compares these values with the separate distance value SD from the output of the memory 77 and which generates an output signal when the pair-wise distance is smaller than this separate distance value. The output signal of the comparator 79 is applied as a counting pulse to a counter 81 which, however, counts this pulse only when it at the same time receives an enable signal from the processor 83.

The processor 83 receives the output signal of the differentiator 61 and also the separate distance value, forms the difference therefrom and compares this value with the value 0. The processor 83 thus generates a signal when the following relation is satisfied, $$D - SD - d_j < 0$$

for which the reading of the memory 27 must be controlled accordingly by the counter 73 or in synchronism with this counter. As a result, only the reference samples are taken into account whose separate distance value at least partly exceeds the range formed by the distance value D and the center point M, so that the recognition range is increased.

When the counting position of the counter 65 exceeds the number of speech samples to be additionally stored, processing time can be saved by releasing the counter 81 only for the speech samples of which at least one is situated outside the distance value, that is to say for which a signal is generated on the line 74. This can be realized by means of the OR-element 66 when the counter 65 generates a signal on its output connected to the OR-elements 66 for as long as the counting position is lower than the number of speech samples which can be additionally stored.

When all distances to a speech sample have been read from the memory 71, a signal from the address counter 73 writes the counting position of the counter 81 in the memory 87 and the counter 81 is reset to the starting value immediately thereafter. Thus, in the memory 87 for each speech sample j the number of n speech samples is counted which have a distance smaller than the separate distance value SD and which at the same time have at least a distance D-SD from the center M.

The next step in FIG. 2 is the processing step 221 during which the speech sample having the maximum number of neighbours is determined. To this end, the numbers $n_j$ are successively read from the memory 87 and applied to the processor 89 which stores each time the highest number and the number of the associated speech sample. When the memory 87 has been completely read, the number of the speech sample most recently stored in the processor 89 is applied, via the line 88, to the address counter 9 of the memory 7 and a mark is inserted at the relevant speech sample, and the counter 65 is advanced one step. If the counting position of the counter 65 previously was higher than the number of speech samples which can be additionally stored, it has previously been reset to the starting position and at the same time the marks generated by the comparator 63 have been erased in the memory 7.

After each complete circulation through the memory 87, the counting position of the counter 65 is compared with the number of speech samples which can be additionally stored, as indicated in the processing step 223 in FIG. 2, and in the case of correspondence the processing is stopped and the speech samples marked thus far in the memory 7 are read, applied to the differentiator 66 and, via the line 68, to the ultimate storage medium. If the counter 65 has not yet reached the corresponding counting position, the memory 87 is read once more and the next smaller number with the associated number of the speech sample is determined and marked in the memory 7, until the counter 65 has reached the corresponding counting position. In the processing step 225 the marked speech samples are thus stored as difference values, and possibly also the other values determined thus far, on the magnetic strip of the identity card. The reference data have thus been stored, and the verification can subsequently take place.

It is to be noted that for the storage of the reference data on the storage medium, the reference data may also be stored in quantized form, be it that some accuracy is lost but a saving is realized as regards storage space.

Figure 7:
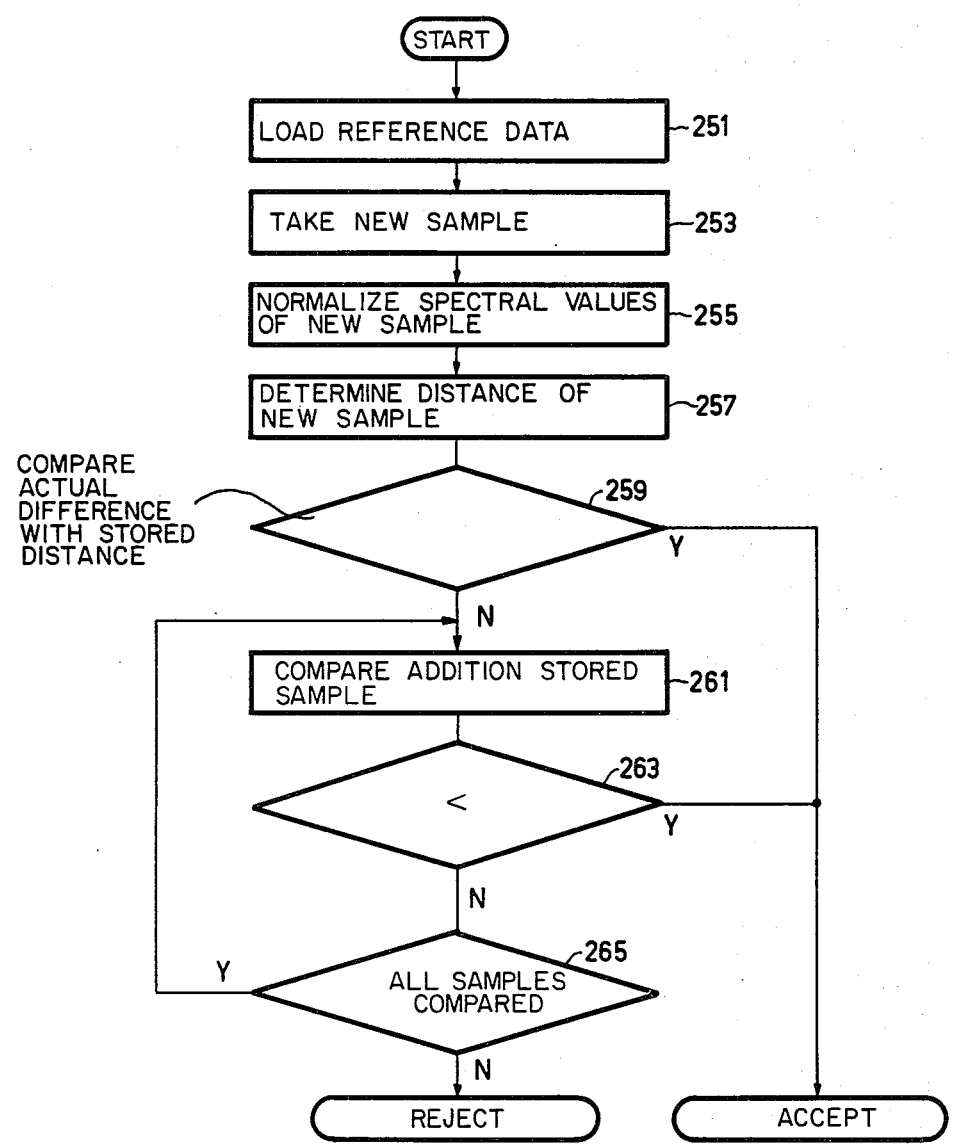
FIG. 7 shows a flow diagram of the processing steps during verification.
Figure 8:
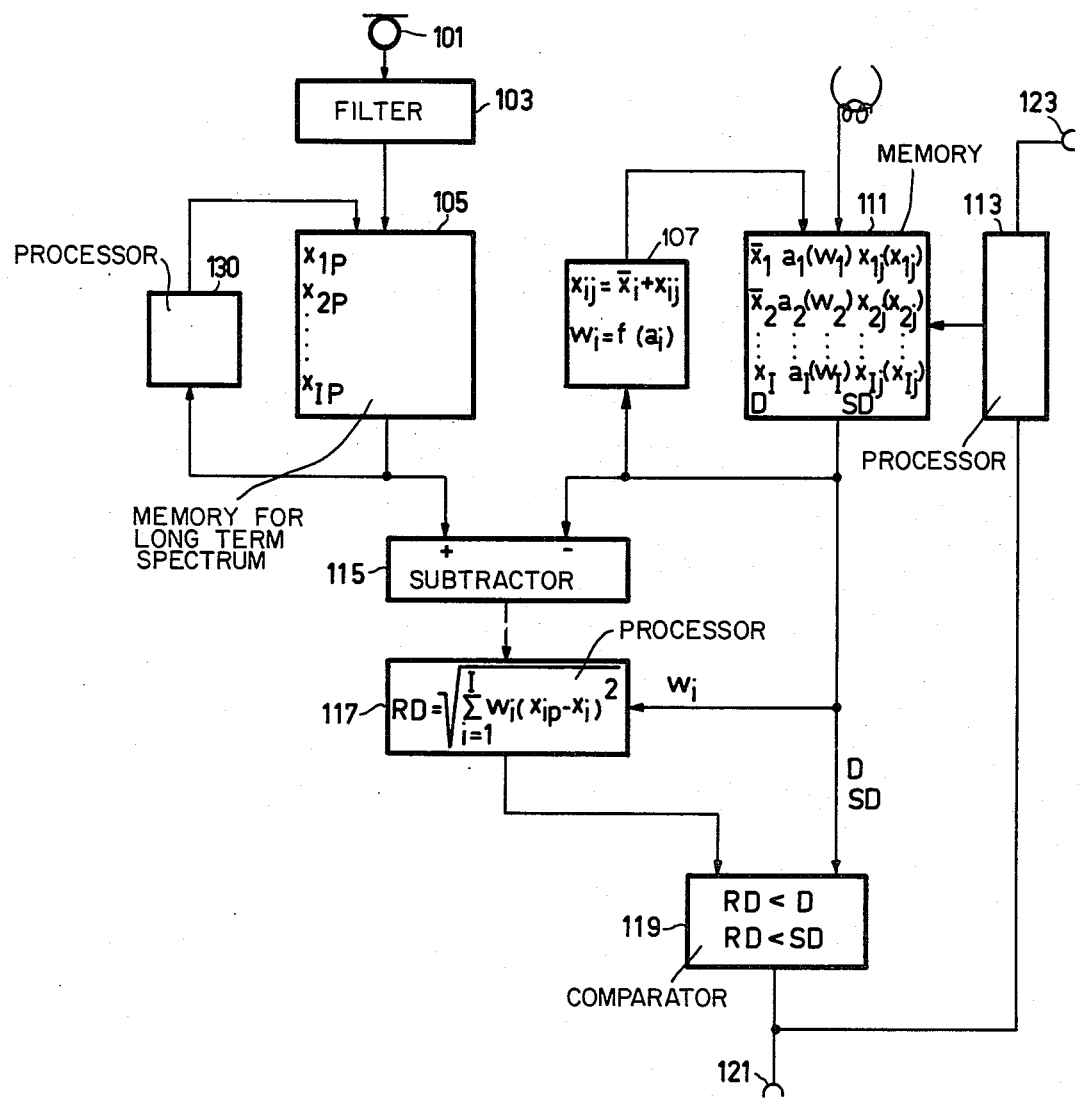
FIG. 8 shows an arrangement for generating the O.K. signal or the rejection signal during verification.

The processing steps during the verification process are shown in FIG. 7, a relevant arrangement being shown in FIG. 8. First of all, during the processing step 251 the memory with the reference data is read, for example, the magnetic strip of the identity card of the speaker to be verified, and these data are transferred to the memory 111. Moreover, the reference data which are not stored in direct form must be calculated again. These data are the difference spectral values $x_{ij}$ generated in the differentiator 66 in FIG. 6 on the output 68, and also the weighting numbers $a_i$. For this purpose these values are successively applied, together with the associated spectral mean value $\bar{x}_i$, to a processor 107 which determines therefrom the spectral values $x_{ij}$ of the additionally stored speech samples and also the weighting factors $w_i$ in the following manner $$x_{ij} = X_{ij} + \bar{x}_i$$
$$w_i = \frac{1}{(a_i + a_{min})^2 \cdot (\bar{x}_i + \Delta)^2}$$

The values $a_{min}$ and $\Delta$ are permanently stored as invariable values. The data thus obtained are written in the memory 111 again, preferably in the locations in which the corresponding output values of the check card have been written in order to limit the capacity of the memory 111.

The next processing step is the step 253 where a speech sample is taken from the speaker to be verified, said sample being converted, in the same way as in FIG. 3, by means of the microphone 101 into an electrical signal which is applied to the filter bank 103, via the amplifier (not shown). The outputs of this bank are again periodically sampled and the values thus derived are summed to form a long-term spectrum and are stored in the memory 105.

The next step is the processing step 255 during which the spectral values of the long-term spectrum thus obtained are normalized in the memory 105. To this end, all values are read and applied to the processor 130 which has a construction and operation as shown in FIG. 3. The memory 105 thus receives the normalized spectral values $x_{ip}$ of the speech sample to be verified.

During the next processing step 257, the distance of the speech sample to be verified from the center point is determined. To this end, the spectral values are read from the memory 105 and at the same time the corresponding spectral mean values are read from the memory 111, both values being applied to the subtractor 115. The differences formed therein are applied to the processor 117 which determines the actual distance RD between the speech sample to be verified and the center point of the reference speech samples determined during the learning phase as follows $$RD = \sqrt{\sum_{i=1}^{I} w_i \cdot (x_i - x_p)^2}$$

To this end, the processor 117 at the same time receives the corresponding weighting factor $w_i$ from the memory 111 by suitable control of the address counter 113.

After determination of the actual distance RD, it is compared in the processing step 259 with the stored distance value D in the comparator 119. If the actual distance is smaller than the distance value, the speaker is recognized and an O.K. signal is generated on output 121. This signal at the same time resets the address counter 113, since the verification process has now been completed.

However, should the actual distance be larger than the distance value D stored in the memory 111, there will be a processing step 261 in which the spectral values of the speech sample to be verified are read from the memory 105 again, while at the same time the spectral values of the first additionally stored speech sample are read from the memory 111 and applied to the differentiator 115. The processor 117 then produces, in the already described manner, the actual distance between the speech sample to be verified and the first additionally stored speech sample, and this actual distance RD is compared with the separate distance value SD stored in the memory 111. If the actual distance is smaller, an O.K. signal is again generated on the output 121 and the counter 113 is reset. Otherwise, it is checked during the processing step 265 whether further additionally stored speech samples are present, that is to say whether the address counter 113 has not yet reached its maximum position; if this condition is satisfied, the distance between the speech sample to be verified and the next additionally stored speech sample is compared with the separate distance value in the described manner. If this is the last speech sample, the address counter 113 reaches its maximum counting position and supplies a rejection signal on the output 123. The verification process has thus been unsuccessfully completed.

It is to be noted that in FIG. 8, like in the FIGS. 3 to 6, the customary progress control and the clock signal source have been omitted. It applies to all arrangements shown that the connections between individual processors or memories on which signals are transmitted which represent multi-bit data words are preferably constructed as bundles of lines comprising one line per bit to be transmitted.

Because the processors are mostly consecutively used, part thereof can each time be combined or used more than once.

What is claimed is:

1. An improved method of verifying a speaker from which a number of reference speech samples have been obtained, a number of characteristics having been derived in the same manner from each reference speech sample, the mean value of the values of each characteristic of all reference speech samples having been determined from the characteristic values of all reference speech samples, a distance value having been determined, the characteristic mean values and the distance value having been stored; and characteristics from a speech sample to be verified having been derived in the same manner and the distance of this speech sample from the center point given by the characteristic mean values having been formed from the sum of the squares of the differences between each characteristic value of the speech sample and the associated characteristic mean value, an O.K. signal having been generated when the sum at the most equals the distance value, characterized in that:

determining and storing a separate distance value from the differences between the characteristic values of two reference speech samples of at least a part of all reference speech samples;

storing the characteristic values of additional reference speech samples within the range defined by the center point and the distance value in the separate range of which, defined by the relevant reference speech sample and the separate distance value, the largest number of further reference speech samples are situated, said separate range being situated partly outside said range;

the distance of the speech sample to be verified being determined also with respect to the reference speech samples and being compared with the separate distance value;

storing, in addition, the characteristic values of reference speech samples which are situated outside the range defined by the center point and the distance value, for the verification of a speech sample to be verified whose distance from the center point is larger than the distance value;

successively determining and comparing the distance from the additionally stored reference speech samples with the stored separate distance value and generating an O.K. signal if at least one distance is smaller than the separate distance value.

2. A method as claimed in claim 1, characterized in that:

there are stored the characteristic values of the further reference speech samples within the range defined by the center point and the distance value are stored in the separate range of which, defined by the relevant reference speech sample and the separate distance value, the largest number of further reference speech samples are situated;

said separate range being situated partly outside said range;

the distance of the speech sample to be verified being determined also with respect to the reference speech samples; and being compared with the separate distance value.

3. A method as claimed in claim 1 or 2, characterized in that the characteristic values of all additionally stored reference speech samples are stored as difference values with respect to the associated characteristic mean values, the characteristic values being determined from the stored values before verification of a speech sample.

4. A method as claimed in claim 1 characterized in that for the determination of the separate distance value from the differences between the characteristic values, of each time two reference speech samples, only the reference speech samples are used which are situated within the range defined by the center point and the characteristic mean values.

5. A method as claimed in claim 1 characterized in that the characteristic values of each reference speech sample and the speech sample to be verified are multiplied, prior to the processing, by such a factor that the sum of the values of a speech sample derived from the characteristic values in the same manner has a predetermined value.

6. A method as claimed in claim 1 characterized in that for each characteristic an associated weighting factor is stored, and for the determination of the distance of the speech sample to be verified from the center point or from an additionally stored reference speech sample, the terms are multiplied by the associated weighting factor before summing.

7. A method as claimed in claim 6, characterized in that for the weighting factor use is made of the reciprocal value of the variance of the associated characteristic, the variance being the mean value of the squares of the deviations of the associated characteristic values of all reference speech samples from the characteristic mean value.

8. A method as claimed in claim 7, characterized in that before the storage of the weighting factors they are divided by a value derived from the associated characteristic mean value, only the partial value thereof which exceeds a predetermined minimum value being stored, the weighting factors being determined from the stored and the predetermined values prior to the verification.

9. A method as claimed in claim 1, characterized in that the characteristics are the frequency components of the long-term spectrum of a speech sample.

* * * * *